United States Patent
Liu et al.

(10) Patent No.: US 12,512,954 B2
(45) Date of Patent: Dec. 30, 2025

(54) APPARATUS AND METHOD OF BANDWIDTH PART OPERATION

(71) Applicant: Lenovo (Beijing) Limited, Beijing (CN)

(72) Inventors: Bingchao Liu, Changping District (CN); Chenxi Zhu, Haidian District (CN); Wei Ling, Changping (CN); Lingling Xiao, Haidian District (CN)

(73) Assignee: Lenovo (Beijing) Limited, Beijing (CN)

( * ) Notice: Subject to any disclaimer, the term of this patent is extended or adjusted under 35 U.S.C. 154(b) by 468 days.

(21) Appl. No.: 17/641,514

(22) PCT Filed: Sep. 29, 2019

(86) PCT No.: PCT/CN2019/109051
§ 371 (c)(1),
(2) Date: Mar. 9, 2022

(87) PCT Pub. No.: WO2021/056539
PCT Pub. Date: Apr. 1, 2021

(65) Prior Publication Data
US 2022/0337381 A1    Oct. 20, 2022

(51) Int. Cl.
*H04L 5/00* (2006.01)
*H04W 72/0446* (2023.01)
(Continued)

(52) U.S. Cl.
CPC ....... *H04L 5/0096* (2013.01); *H04W 72/0446* (2013.01); *H04W 72/0453* (2013.01); *H04W 72/23* (2023.01)

(58) Field of Classification Search
CPC ............. H04L 5/0096; H04W 72/23; H04W 72/0446; H04W 72/0453
See application file for complete search history.

(56) References Cited

U.S. PATENT DOCUMENTS

| | | | |
|---|---|---|---|
| 11,706,744 B2* | 7/2023 | Park | H04W 72/23 370/329 |
| 2018/0270699 A1* | 9/2018 | Babaei | H04W 28/0278 |

(Continued)

FOREIGN PATENT DOCUMENTS

| | | |
|---|---|---|
| CN | 109474375 A | 3/2019 |
| CN | 109474994 A | 3/2019 |

(Continued)

OTHER PUBLICATIONS 19946579.0 , "Extended European Search Report", EP Application No. 19946579.0, May 4, 2023, 12 pages.

(Continued)

*Primary Examiner* — Shean Tokuta
(74) *Attorney, Agent, or Firm* — FIG. 1 Patents

(57) ABSTRACT

Apparatus and methods of bandwidth part (BWP) operation for multiple downlink control information (DCI) based multiple transmit receive points (TRP) transmission are disclosed. The apparatus includes: a receiver that receives a plurality of Downlink Control Information (DCIs) in a slot, each of the DCIs having a Bandwidth Part (BWP) indicator field for indicating a BWP for a corresponding downlink (DL) reception or uplink (UL) transmission; and a processor that detects whether any one of the BWPs indicated in the DCIs is different from a current BWP which is used to receive the DCIs; and, upon detection that at least one of the BWPs indicated by the DCIs is different from the current BWP, configures the receiver and/or a transmitter to perform a BWP change.

20 Claims, 7 Drawing Sheets

(51) Int. Cl.
*H04W 72/0453* (2023.01)
*H04W 72/23* (2023.01)

(56) References Cited

U.S. PATENT DOCUMENTS

| | | | | |
|---|---|---|---|---|
| 2019/0103953 | A1* | 4/2019 | Liao | H04W 72/23 |
| 2019/0132109 | A1* | 5/2019 | Zhou | H04L 27/2607 |
| 2019/0132793 | A1* | 5/2019 | Lin | H04W 52/0206 |
| 2019/0132845 | A1* | 5/2019 | Babaei | H04L 1/1812 |
| 2019/0149305 | A1* | 5/2019 | Zhou | H04L 27/2666 370/330 |
| 2019/0166066 | A1* | 5/2019 | Ang | H04L 5/0078 |
| 2019/0166529 | A1* | 5/2019 | Chen | H04L 5/0053 |
| 2019/0215870 | A1* | 7/2019 | Babaei | H04W 24/10 |
| 2019/0215900 | A1* | 7/2019 | Pan | H04W 72/23 |
| 2019/0223086 | A1 | 7/2019 | Jung et al. | |
| 2019/0357262 | A1* | 11/2019 | Cirik | H04W 24/08 |
| 2020/0037248 | A1* | 1/2020 | Zhou | H04L 5/0032 |
| 2020/0221306 | A1* | 7/2020 | Chen | H04W 16/14 |
| 2020/0244410 | A1* | 7/2020 | Kim | H04L 5/0098 |
| 2020/0288474 | A1* | 9/2020 | Park | H04W 72/23 |
| 2020/0351892 | A1* | 11/2020 | Yi | H04W 72/53 |
| 2021/0360683 | A1* | 11/2021 | Chen | H04W 72/0446 |

FOREIGN PATENT DOCUMENTS

| | | | | |
|---|---|---|---|---|
| CN | 109788563 | A | 5/2019 | |
| EP | 3478019 | A1 * | 5/2019 | H04W 72/1263 |
| EP | 3893421 | A1 * | 10/2021 | H04W 72/23 |
| WO | WO-2019051177 | A1 * | 3/2019 | H04L 5/003 |
| WO | WO-2019083245 | A1 * | 5/2019 | H04W 74/08 |
| WO | WO-2019139411 | A1 * | 7/2019 | H04W 72/23 |
| WO | WO-2019139444 | A1 * | 7/2019 | H04W 72/23 |
| WO | WO-2020077667 | A1 * | 4/2020 | H04W 72/04 |
| WO | WO-2020191559 | A1 * | 10/2020 | H04W 72/23 |
| WO | WO-2020194741 | A1 * | 10/2020 | H04L 5/0041 |

OTHER PUBLICATIONS

Huawei, et al., "Remaining details for DL design on multi-TRP/panel transmission for eMBB", 3GPP TSG RAN WG1 #97, R1-1906040, Reno, USA [retrieved Jun. 6, 2023]. Retrieved from the internet <https://www.3gpp.org/ftp/tsg_ran/WG1_RL1/TSGR1_97/Docs>., May 17, 2019, 7 pages.

Nokia, et al., "Enhancements on Multi-TRP/Panel Transmission", 3GPP TSG RAN WG1 #98 Meeting, R1-1909209, Prague, CZ [retrieved Jun. 6, 2023]. Retrieved from the Internet <https://www.3gpp.org/ftp/TSG_RAN/WG1_RL1/TSGR1_98/Docs/?sortby=sizerev>., May 2019, 29 Pages.

NTT Docomo, Inc, "Enhancements on multi-TRP/panel transmission", 3GPP TSG RAN WG1 #98, R1-1909201, Prague, CZ [retrieved Jun. 6, 2023]. Retrieved from the Internet <https://www.3gpp.org/ftp/tsg_ran/WG1_RL1/TSGR1_98/Docs>., Aug. 2019, 36 Pages.

"International Preliminary Report on Patentability", PCT Application No. PCT/CN2019/109051, Apr. 7, 2022, 5 pages.

"International Search Report and Written Opinion", PCT Application No. PCT/CN2019/109051, Jun. 24, 2020, 6 pages.

* cited by examiner

| Field (Item) | Bits |
|---|---|
| Identifier for DCI formats | 1 |
| Carrier indicator | 0 or 3 |
| UL/SUL Indicator | 0,1 |
| Bandwidth part indicator | 0,1,2 ← 402 |
| Frequency domain resource assignment | Variable |
| Time domain resource assignment | 4 ← 404 |
| Frequency Hopping Flag | 0,1 |
| ... | ... |

DCI 400

Figure 4A

| Value of BWP indicator field 2 bits (412) | Bandwidth part (414) |
|---|---|
| 00 | Configured BWP with BWP-Id = 1 |
| 01 | Configured BWP with BWP-Id = 2 |
| 10 | Configured BWP with BWP-Id = 3 |
| 11 | Configured BWP with BWP-Id = 4 |

Figure 4B

APPARATUS AND METHOD OF BANDWIDTH PART OPERATION

FIELD

The subject matter disclosed herein relates generally to wireless communication and more particularly relates to, but not limited to, apparatus and methods of bandwidth part (BWP) operation for multiple downlink control information (DCI) based multiple transmit receive points (TRP) transmission.

BACKGROUND

The following abbreviations and acronyms are herewith defined, at least some of which are referred to within the following description.

Third Generation Partnership Project (3GPP), 5th Generation (5G), New Radio (NR), 5G Node B/generalized Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Hybrid Automatic Repeat Request Acknowledgement (HARQ-ACK), Physical Downlink Control Channel (PDCCH), Physical Downlink Shared Channel (PDSCH), Physical Uplink Control Channel (PUCCH), Physical Uplink Shared Channel (PUSCH), Bandwidth Part (BWP), Control Resource Set (CORESET), Downlink Control Information (DCI), enhanced Mobile Broadband (eMBB), Identification (ID), Light Emitting Diode (LED), Media Access Control (MAC), Random-access Memory (RAM), Radio Resource Control (RRC), Secondary Cell (SCell), Transmit Receive Point (TRP), Frequency Range 1 (FR1), Frequency Range 2 (FR2), Liquid Crystal Display (LCD), Organic LED (OLED), Multi-DCI (M-DCI), Multi-TRP (M-TRP), Single-DCI (S-DCI). As used herein, "HARQ-ACK" may represent collectively the Positive Acknowledge (ACK) and the Negative Acknowledge (NACK). ACK means that a TB is correctly received while NACK means a TB is erroneously received.

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

In NR Release 15, only downlink transmission from a single Transmit Receive Point (TRP) is supported. NR Release 16 will support multiple TRPs. Enhancements on multi-TRP transmission including improved reliability and robustness with both ideal and non-ideal backhaul between these TRPs are studied for NR Release 16. A TRP is an apparatus to transmit and receive signals, and is controlled by a gNB through the backhaul between the gNB and the TRP.

Both single-DCI (S-DCI) based, and multi-DCI (M-DCI) based, multi-TRP (M-TRP) DL transmission will be supported in Release 16, with ideal and non-ideal backhaul. It is understood that a UE can only transmit or receive in one bandwidth part (BWP).

BWP switching is supported in Release 15 based on DCI format 0_1, or format 1_1, or based on a higher layer configured timer. In Release 15, only one enhanced Mobile Broadband (eMBB) DCI can be transmitted in one slot. The UE follows the potential BWP change indicated by the BWP indicator field carried by DCI format 0_1 or format 1_1.

For NR Release 16, however, each TRP may independently transmit DCIs in any available downlink (DL) slots, and the UE may receive more than one DCIs in the first 3 symbols in a slot in a M-TRP scenario. Since two or more BWP change indications may be received by a UE in a same slot, the corresponding UE behavior needs to be specified. For timer-based BWP switching, UE behavior may also be different if different DCIs are received from different TRPs.

SUMMARY

Apparatus and methods of BWP operation for multi-DCI based multi-TRP transmission are disclosed.

According to a first aspect, there is provided an apparatus, comprising: a receiver that receives a plurality of Downlink Control Information (DCIs) in a slot, each of the DCIs having a Bandwidth Part (BWP) indicator field for indicating a BWP for a corresponding downlink (DL) reception or uplink (UL) transmission; and a processor that detects whether any one of the BWPs indicated in the DCIs is different from a current BWP which is used to receive the DCIs; and, upon detection that at least one of the BWPs indicated by the DCIs is different from the current BWP, configures the receiver and/or a transmitter to perform a BWP change.

According to a second aspect, there is provided a method, comprising: receiving, by a receiver, a plurality of Downlink Control Information (DCIs) in a slot, each of the DCIs having a Bandwidth Part (BWP) indicator field for indicating a BWP for a corresponding downlink (DL) reception or uplink (UL) transmission; and detecting, by a processor, whether any one of the BWP indicator fields in the DCIs indicates to a BWP different from a current BWP which is used to receive the DCIs; and, upon detection that at least one of the BWP indicator fields carried by the DCIs indicates to a BWP different from the current BWP, configuring the receiver and/or a transmitter to perform a BWP change.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which:

FIG. 4A is a schematic diagram illustrating part of fields of a DCI format 0_1;

FIG. 4B is a schematic diagram illustrating values of a BWP indicator field of a DCI and their corresponding BWPs;

DETAILED DESCRIPTION

Figure 1:
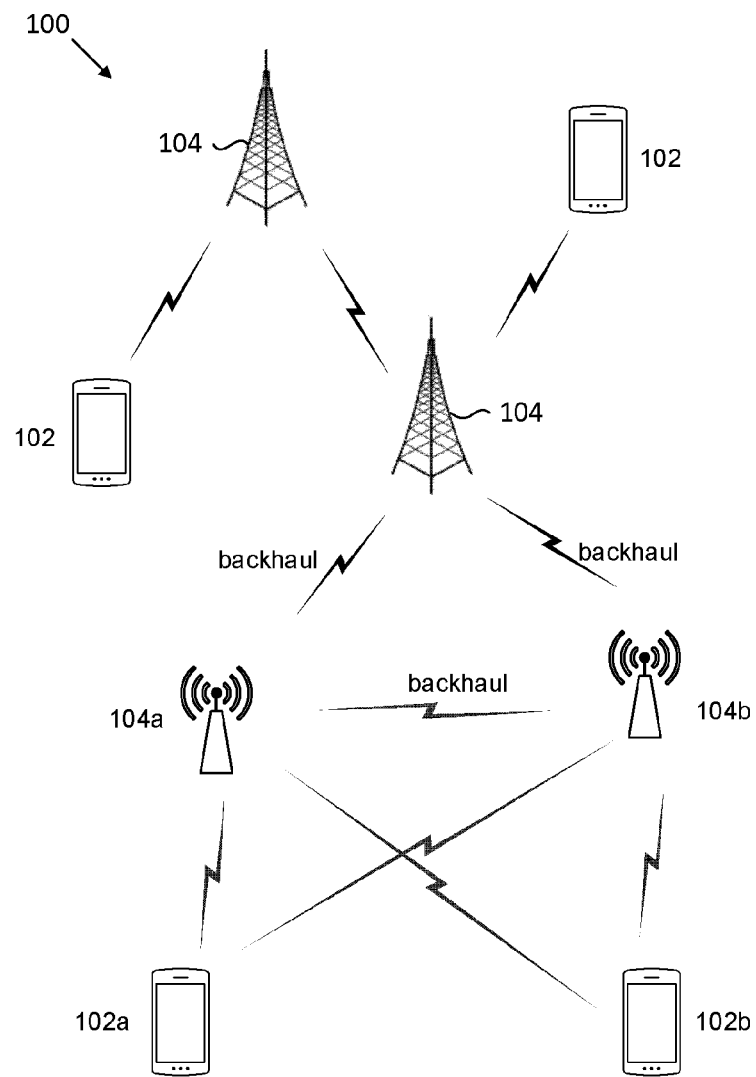
FIG. 1 is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM, or Flash memory), a portable Compact Disc Read-Only Memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. Features, structures, elements, or characteristics described in connection with one or some embodiments are also applicable to other embodiments, unless expressly specified otherwise. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions or acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100 with multiple TRPs 104a. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

The NE 104 may also include one or more transmit receive points (TRPs) 104a, 104b. In some embodiments, the network equipment may be a gNB 104 that controls a number of TRPs 104a, 104b. In addition, there may be a backhaul between two TRPs 104a, 104b. In some other embodiments, the network equipment may be a TRP 104a, or a TRP 104b, that is controlled by a gNB.

Direct or indirect communication link between two or more NEs 104 may be provided.

Communication links are provided between the NEs 104, 104a, 104b and the UEs 102, 102a, 102b. The communication links, for example, may be NR UL or DL communication links. Some UEs 102, 102a, 102b may simultaneously communicate with different Radio Access Technologies (RATs), such as NR and LTE.

In some embodiments, a UE 102a, 102b may be able to communicate with two or more TRPs 104a, 104b that utilize an ideal or non-ideal backhaul, simultaneously. Multiple beams may be used by the UE and/or TRP(s). The two or more TRPs may be TRPs of different gNBs, or a same gNB.

Figure 2:
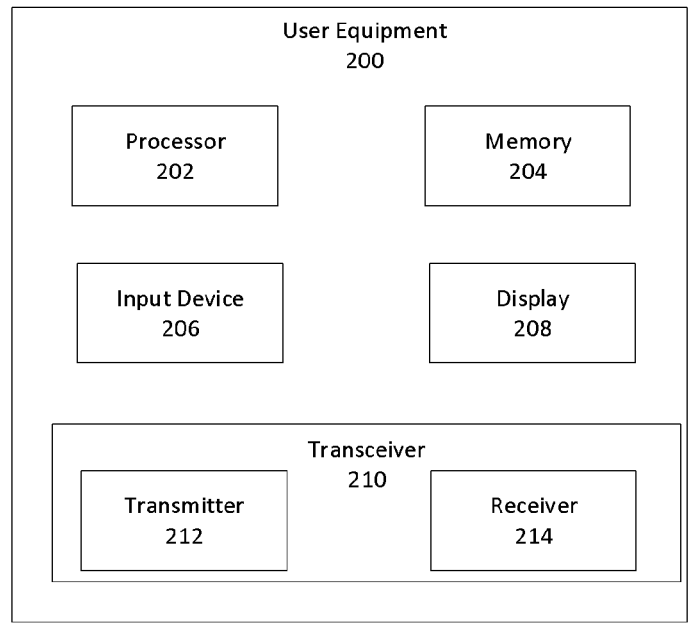
FIG. 2 is a schematic block diagram illustrating components of user equipment (UE) according to one embodiment.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or a similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and the display 208 may form a touchscreen or a similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
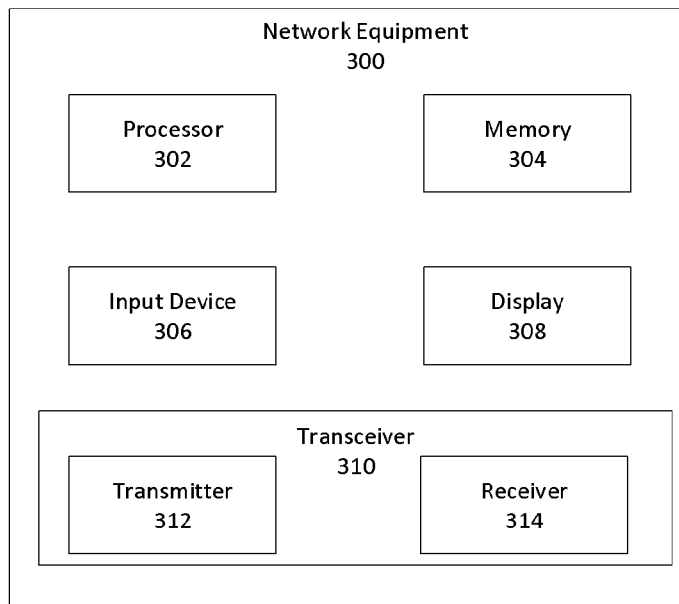
FIG. 3 is a schematic block diagram illustrating components of network equipment (NE) according to one embodiment.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. For example, the processor 302 may control the transceiver 310 to receive a Physical Uplink Control Channel (PUCCH) resource and/or a Physical Uplink Shared Channel (PUSCH) resource. In another example, the processor 302 may control the transceiver 310 to transmit DL signals containing various configuration data to the UE 200, as described above.

The transceiver 310, in one embodiment, is configured to communicate wirelessly with the UE 200. In certain embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, wherein the transceiver 310 includes a transmitter 312 and a receiver 314 for each cell or cell sector.

Downlink Control Information (DCI) is a special set of information which schedules a downlink data channel (e.g, Physical Downlink Shared Channel or PDSCH) or an uplink data channel (e.g, Physical Uplink Shared Channel PUSCH). Several types of DCIs are defined in NR Release 15, including: format 0_0, format 0_1, format 1_0, format 1_1, format 2_0, format 2_1, format 2_2, format 2_3. Each DCI format may include a different combination of fields, and may be used for a specific function. For example, DCI format 0_0 and format 0_1 may be used for the scheduling of PUSCH in one cell. FIG. 4A is a schematic diagram illustrating part of fields of a DCI format 0_1. In this example, the DCT 400 may include, among other fields, a bandwidth part (BWP) indicator field 402, and a time domain resource assignment field 404. The BWP indicator field 402 may have a length of zero, one, or two bits. The time domain resource assignment field may have a length of 4 bits.

FIG. 4B is a schematic diagram illustrating values of a BWP indicator field 412 of a DCI and their corresponding BWPs 414. BWP is a contiguous set of physical resource blocks, selected from a contiguous subset of the common resource blocks for a given numerology(u) on a given carrier. In some embodiments, a maximum of 4 BWPs may be specified for DL and UL transmissions.

For example, in DCI format 0_1, bandwidth part indicator — 0, 1 or 2 bits may be determined by the number of UL BWPs $n_{BWP,RRC}$ configured by higher layers, excluding the initial UL bandwidth part. The bitwidth for this field is determined as $\lfloor \log_2(n_{BWP}) \rfloor$ bits, where $n_{BWP}=n_{BWP,RRC}+1$, if $n_{BWP,RRC} \leq 3$, in which case the bandwidth part indicator is equivalent to the ascending order of the higher layer parameter BWP-Id;

otherwise $n_{BWP}=n_{BWP,RRC}$, in which case the bandwidth part indicator is defined in FIG. 4B.

If a UE does not support active BWP change via DCI, the UE ignores this bit field.

The BWP switching for a Serving Cell is used to activate an inactive BWP and deactivate an active BWP at a time. The BWP switching is controlled by the Physical Downlink Control Channel (PDCCH) indicating a downlink assignment or an uplink grant, by the bwp-InactivityTimer, by RRC signalling, or by the MAC entity itself upon initiation of Random Access procedure. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively is active without receiving PDCCH indicating a downlink assignment or an uplink grant. The active BWP for a Serving Cell is indicated by either RRC or PDCCH.

In the example as shown in FIG. 4B, the BWP indicator field 412 has a bitwidth of 2, and may have four different values 00, 01, 10, and 11, each representing a particular bandwidth part. For example, value 00 of the BWP indicator field may indicate that BWP with BWP-Id=1, i.e. BWP #1, should be configured to a UE for a DL reception and/or UL transmission.

For multi-DCI (M-DCI) based multi-TRP (M-TRP) DL transmission, each TRP may independently transmit a DCI in a slot scheduling one or more Physical Downlink Shared Channel (PDSCH) transmission transmitted from the corresponding TRP. A UE may receive two DCIs, each containing a different BWP switching command, in one slot. For example, the two BWP indicator fields contained in the two DCIs may have different values, which are also different from the currently active BWP of the UE. In another example, a first DCI received from a first TRP may indicate a BWP different from the currently active BWP, while a second DCI received from a second TRP may indicate a BWP that is the same as the currently active BWP. In both examples, it needs to determine which BWP switching command should be followed. The term "BWP switching command" in this disclosure may refer to a BWP indicator value for both cases of: 1) switching to a new BWP that is different from the currently active BWP, and 2) maintaining the currently active BWP. Similarly, unless expressly specified otherwise, the terms "BWP switch", "BWP change" and "BWP selection" may be used interchangeably for referring both cases above. For M-TRP with both ideal and non-ideal backhaul, the backhaul delay and BWP switching delay should be considered and may lead to different UE behaviors in different scenarios.

In some embodiments, the BWP switching command may be firstly coordinated among the TRPs and the UE does not expect to receive multiple DCIs in the same slot with different BWP indicator values.

Figure 5:
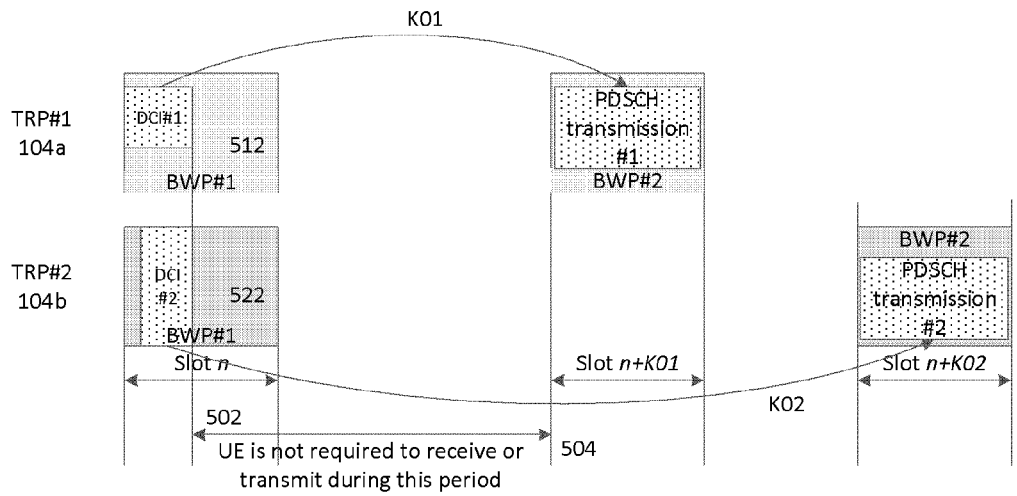
FIG. 5 is a schematic diagram illustrating a multi-DCI based BWP operation with ideal coordination according to one embodiment.

FIG. 5 is a schematic diagram illustrating a multi-DCI based BWP operation with ideal coordination according to one embodiment. In this example, DCI #1 and DCI #2 are transmitted from TRP #1 104a and TRP #2 104b in slot n, respectively. DCI #1 is received in time-frequency resource(s) identified by a first Control Resource Set (CORESET) 512. DCI #2 is received in time-frequency resource(s) identified by a second CORESET 522. DCI #1 may include a time domain resource assignment field having a value K01, scheduling PDSCH transmission #1 to be transmitted in slot n+K01. DCI #2 may include a time domain resource assignment field having a value K02, scheduling PDSCH transmission #2 to be transmitted in slot n+K02. Both 3DCI #1 and DCI #2 are received in the same DL BWP, i.e. the currently active BWP #1. In this case, an ideal coordination between the TRP #1 104a and TRP #2 104b is provided. Accordingly, both PDSCH transmission #1 and PDSCH transmission #2 are scheduled to be received in a same BWP, e.g. BWP #2, that may be different from the currently active BWP, i.e. BWP #1.

The slot offset, i.e. K01 and K02, indicated by the time domain resource assignment field in DCI #1 and DCI #2 should be equal to or larger than a delay required by the UE for an activate DL BWP switching. In some embodiments, each slot may comprise a sequence of symbols, e.g. 14 symbols, and the DCIs are transmitted no later than the third symbol. In this case, the UE is not required to receive and/or transmit during the time duration from the end of the third symbol of slot n 502 until the beginning of the first indicated slot n+K01 504. The UE may continue to transmit and/or receive in the new BWP, e.g. BWP #2, starting from the beginning of slot n+K01, given K02>K01. Accordingly, the UE may transmit and/or receive during the time duration from the beginning of the first slot n+K01 504 until the beginning of the second slot n+K02.

In this example, a UE does not expect to receive multiple DCIs in the same slot indicating different DL or UL BWP changes.

If the UE detects more than one DCI indicating an active DL BWP change for a cell in a same slot, the UE is not required to receive or transmit in the cell during a time duration from the end of the third symbol of a slot where the UE receives the DCI that indicates a DL BWP change in a scheduling cell until the beginning of a slot indicated by the smaller slot offset value of the time domain resource assignment fields in the DCIs.

If the UE detects more than one DCI indicating an active UL BWP change for a cell in a same slot, the UE is not required to receive or transmit in the cell during a time duration from the end of the third symbol of a slot where the UE receives the DCI that indicates a UL BWP change in a scheduling cell until the beginning of a slot indicated by the smaller slot offset value of the time domain resource assignment fields in the DCIs.

Figure 6:
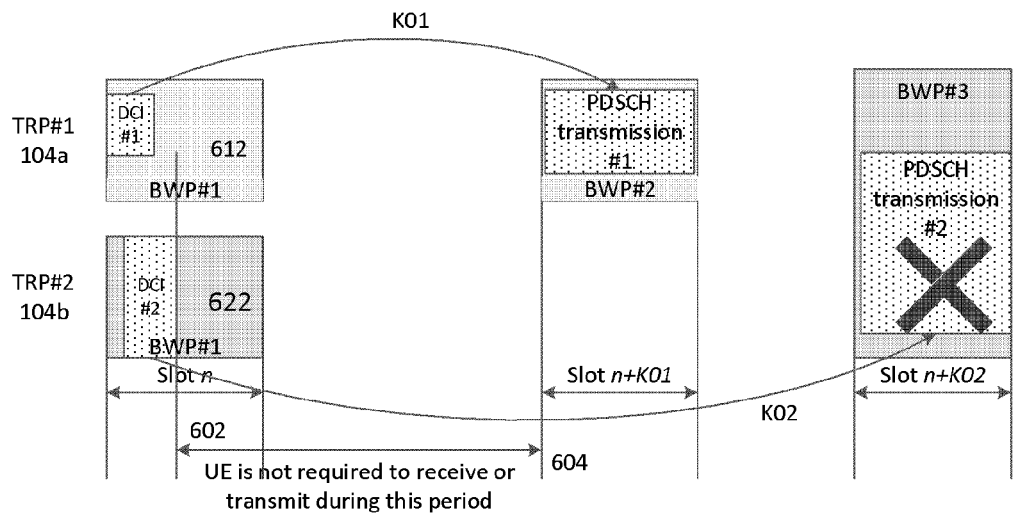
FIG. 6 is a schematic diagram illustrating a multi-DCI based BWP operation with non-ideal coordination according to one embodiment.

FIG. 6 is a schematic diagram illustrating a multi-DCI based BWP operation with non-ideal coordination according to one embodiment. In this example, DCI #1 and DCI #2 are transmitted from TRP #1 104a and TRP #2 104b in slot n, respectively. DCI #1 is received in time-frequency resource(s) identified by a first Control Resource Set (CORESET) 612. DCI #2 is received in time-frequency resource(s) identified by a second CORESET 622. DCI #1 may include a time domain resource assignment field having a value K01, scheduling PDSCH transmission #1 to be transmitted in slot n+K01. DCI #2 may include a time domain resource assignment field having a value K02, scheduling PDSCH transmission #2 to be transmitted in slot n+K02. Both DCI #1 and DCI #2 are received in the same BWP, i.e. the currently active DL BWP #1. In this case, an ideal coordination between the TRP #1 104a and TRP #2 104b is not provided, that is, non-ideal coordination is provided. PDSCH transmission #1 and PDSCH transmission #2 may be scheduled to be received in different BWPs, e.g. BWP #2 and BWP3 respectively, and both may be different from the currently active BWP, i.e. BWP #1.

In this case, the UE will only follow the BWP change indicated by one DCI and ignore the other DCI and the corresponding PDSCH(s).

In some embodiments, for example, one DCI is received earlier than the other in a slot. The UE may only follow the BWP switching indication (i.e. value of the BWP indicator field) carried by the first received DCI and receive the corresponding PDSCH transmission(s), while the BWP switching indication carried by the other DCI and the corresponding PDSCH will be ignored. As shown in FIG. 6 for example, DCI #1 is received in the second symbol while DCI #2 is received in the third symbol in slot n. The UE only follows the BWP switching indication carried by DCI #1 and switches to BWP #2 to receive the scheduled PDSCH transmission #1. The BWP switching indication carried by DCI #2 and the scheduled PDSCH transmission #2, in BWP #3 will be ignored. If the DCIs are received at the same time (i.e. in the same symbol), the DCI transmitted from the CORESET configured with a lower index value (if configured) will be effective and the other DCI will be ignored. For example, the DCIs comprise a first DCI indicating a first BWP, and a second DCI received after reception of the first DCI indicating a second BWP; and the processor 202 configures the receiver 214 and/or the transmitter 212 to switch to the first BWP indicated by the first DCI, ignoring the second DCI.

In some other embodiments, the UE always follows the BWP indication carried by the DCI transmitted from the CORESET configured with a lower index value if configured or the DCI transmitted from the CORESET with a lower CORESET-ID, and the other DCI and the corresponding PDSCH transmission will be ignored. In this case, it may not matter whether the selected DCI is received before or after the other DCI, where the selected DCI is received in time-frequency resource(s) identified by the CORESET configured with a lower index value or lower CORESET-ID. For example, the DCIs comprise a first DCI received in time-frequency resource(s) identified by a first Control Resource Set (CORESET) indicating a first BWP and a second DCI received in time-frequency resource(s) identified by a second CORESET indicating a second BWP; where the CORESETs are configured with indices, the processor 202 configures the receiver 214 and/or the transmitter 212 to select a target BWP indicated by the DCI transmitted in the time-frequency resource(s) identified by one of the CORESETs configured with a lower index value; and where the CORESETs are not configured with indices, the processor 202 configures the receiver 214 and/or the transmitter 212 to select a target BWP indicated by the DCI transmitted in the time-frequency resource(s) identified by one of the CORESETs with a lower CORESET-ID.

In some yet further embodiments, the UE may determine the times of the scheduled PDSCH transmissions by the respective DCIs, and select, for example, one of the DCIs that schedules the earliest PDSCH to follow. The other DCI and its corresponding PDSCH(s) may be ignored.

Timer based BWP activation/deactivation is also supported in NR Release 15, and a timer value is configured by the higher layer parameter bwp-InactivityTimer. While the timer is running, the UE decrements the timer at the end of a subframe for FR1 or at the end of a half subframe for FR2 if the UE does not detect a DCI format 1_1 for paired spectrum or if the UE does not detect a DCI format 1_1 or DCI format 0_1 for unpaired spectrum during the interval. The UE switches to the default DL BWP from an active DL BWP when the timer expires. The UE can be configured with a default DL BWP among the configured BWPs. If default DL BWP is not provided by higher layers, the default DL BWP may be defined as the initial active DL BWP.

For the M-DCI based M-TRP DL transmission scenario, each TRP may independently transmit DCI to schedule PDSCH(s). The UE may restart the timer upon detecting a DCI transmitted from either one of the TRPs, or a specific one of the TRPs, before the timer expires. Based on this, two options are provided in FIG. 7 and FIG. 8. Which one of the two options should be employed may be configured by higher layers.

Figure 7:
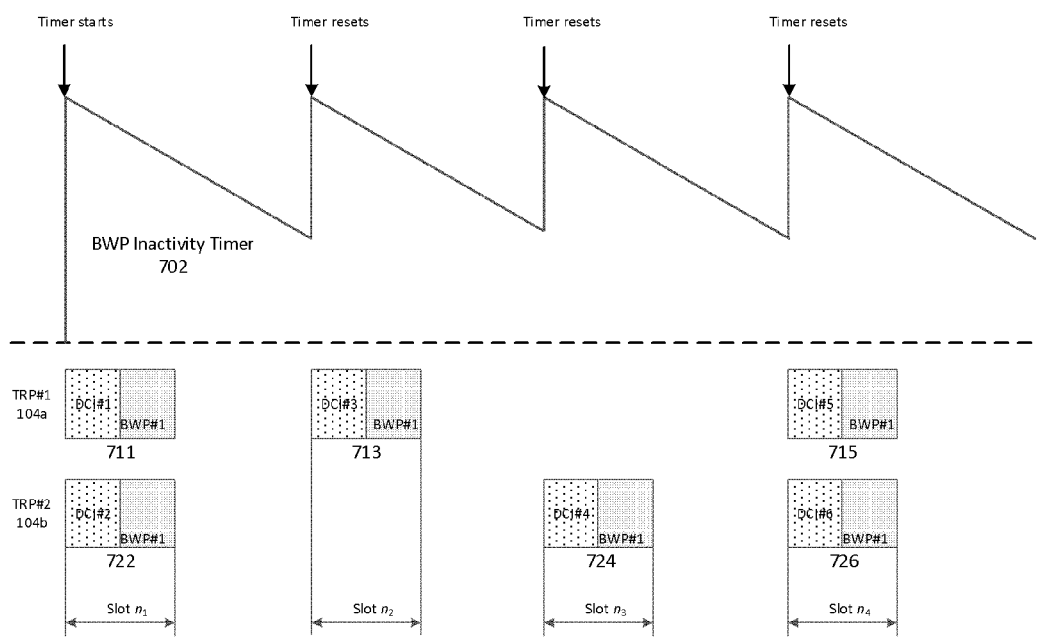
FIG. 7 is a schematic diagram illustrating a timer-based BWP operation that is based on the DCI transmitted from each TRP according to another embodiment.

FIG. 7 is a schematic diagram illustrating a timer-based BWP operation that is based on the DCI transmitted form each TRP according to another embodiment. The timer resets when a DCI scheduling PDSCH transmitted is received from either TRP. The UE will restart the timer when the UE receives one or more DCIs in a slot in the time-frequency resource(s) identified by either one or more CORESETs among the configured CORESET(s) scheduling one or more PDSCH transmissions before the timer expires. In particular, a BWP inactivity timer 702 is provided. The timer 702 starts when an activate DL BWP is switched to a non-default DL BWP, e.g. BWP #1 (assuming the default BWP is any one of BWP #2, BWP #3 and BWP #4), in slot $n_1$. In this example, the UE may have also received two DCIs, e.g. DCI #1 transmitted in time-frequency resource(s) identified by a CORESET 711 and DCI #2 in time-frequency resource(s) identified by a CORESET 722 that are transmitted from TRP #1 104a and TRP #2 104b, respectively. The UE further receives DCI #3 in time-frequency resource(s) identified by a CORESET 713 in slot $n_2$ and DCI #5 in time-frequency resource(s) identified by a CORESET 715 in slot $n_4$ from TRP #1 104a, and DCI #4 in time-frequency resource(s) identified by a CORESET 724 in slot $n_3$ and DCI #6 in time-frequency resource(s) identified by a CORESET 726 in slot $n_4$ from TRP #2 104b. In this example, all DCIs, i.e. DCI #1 to DCI #6, are received in BWP #1. The timer 702 will restart when a DCI scheduling PDSCH transmission(s) on the activated DL BWP is received. The DCI may be received in time-frequency resource(s) identified by either CORESET. Accordingly, the timer will restart in slot $n_2$, $n_3$ and $n_4$ before it expires.

In some other embodiments, the timer restarts when a DCI scheduling PDSCH is received from a specific TRP. In this option, the UE will only restart the timer when it receives a DCI transmitted from a specific TRP, or a specific CORESET group, in a slot scheduling one or more PDSCH transmissions before the timer expires.

It has been agreed that a higher layer index may be configured for each CORESET for the generation of separate Hybrid Automatic Repeat Request Acknowledgement (HARQ-ACK) feedback for M-DCI based M-TRP DL transmission in a slot. The CORESET(s) assigned for one TRP may be configured with a same index value, and the indices configured for the CORESETs assigned for different TRPs may have different values. Based on this, the UE will only restart the timer when the UE receives a DCI transmitted in the time-frequency resource(s) identified by the CORESET configured with a lower, or a higher, index value in a slot before the timer expires.

Figure 8:
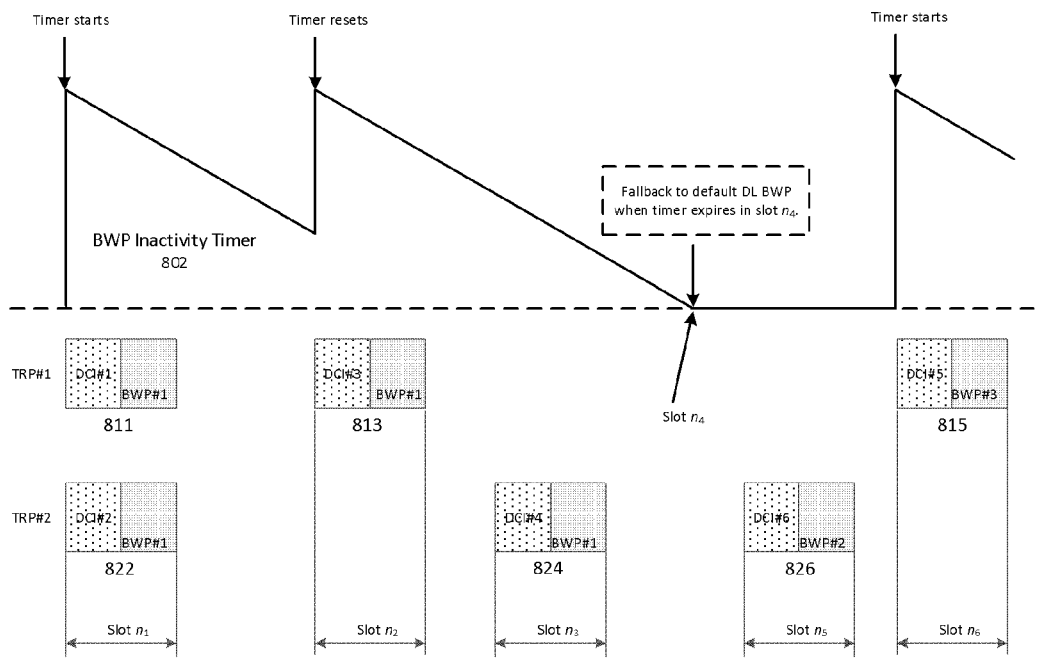
FIG. 8 is a schematic diagram illustrating a timer-based BWP operation based on the DCI transmitted from a specific TRP according to one embodiment.

FIG. 8 is a schematic diagram illustrating a timer-based BWP operation based on the DCI transmitted from a specific TRP according to one embodiment. The configured timer starts when an activate DL BWP is switched to a non-default DL BWP, e.g. BWP #1, in slot $n_1$ The timer will restart when a DCI transmitted in the time-frequency resource(s) identified by the CORESET configured with a lower index value if configured scheduling PDSCH(s) on the activated DL BWP is received. In particular, a BWP inactivity timer 802 is provided. The timer 802 starts when an activate DL BWP is switched to a non-default DL BWP, e.g. BWP #1 (assuming that the default BWP is BWP #2), in slot $n_1$. In this example, the UE may have received two DCIs in a slot, DCI #1 transmitted in time-frequency resource(s) identified by a CORESET 811 and DCI #2 transmitted in time-frequency resource(s) identified by a CORESET 822 that are transmitted from TRP #1 104a and TRP #2 104b, respectively. The UE further receives DCI #3 in time-frequency resource(s) identified by a CORESET 813 in slot $n_2$ and DCI #5 in time-frequency resource(s) identified by a CORESET 815 in slot $n_6$ from TRP #1 104a, and DCI #4 in time-frequency resource(s) identified by a CORESET 824 in slot $n_3$ and DCI #6 in time-frequency resource(s) identified by a CORESET 826 in slot $n_5$ from TRP #2 104b.

In this example, DCI #1 to DCI #4 are received in BWP #1. Assuming that the CORESET(s) assigned for TRP #1 104a is configured with a lower index value, the UE resets the timer 802 in slot $n_2$ and dose not restart the timer in slot $n_3$ as the CORESET 813 has a lower index value than the CORESET 824. When the timer 802 expires, for example in slot $n_4$, the UE will fall back to the default DL BWP, e.g. BWP #2. After slot $n_4$, if no DL BWP change is received, the UE may only receive DCIs transmitted in BWP #2 from either TRP, e.g. DCI #6 in time-frequency resource(s) identified by the CORESET 826. The timer will start in slot $n_6$ again when DCI #5 is transmitted from TRP #1 in the non-default DL BWP, e.g. BWP #3.

Figure 9:
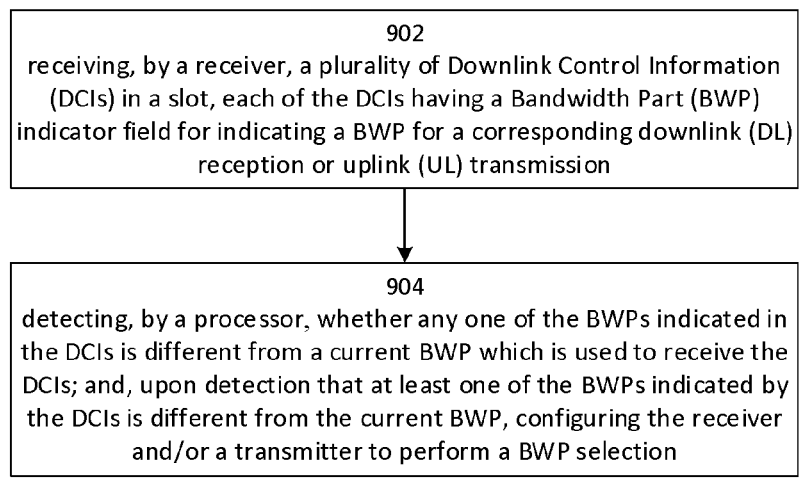
FIG. 9 is a flow chart illustrating steps of BWP operation for multi-DCI based multi-TRP transmission according to one embodiment.

FIG. 9 is a flow chart illustrating steps of BWP operation for multi-DCI based multi-TRP transmission according to one embodiment.

At step 902, the receiver 214 on the UE side receives a plurality of Downlink Control Information (DCIs) in a slot, each of the DCIs having a Bandwidth Part (BWP) indicator field for indicating a BWP for a corresponding downlink (DL) reception or uplink (UL) transmission.

At step 904, the processor 202 detects whether any one of the BWP indicator fields in the DCIs indicates to a BWP different from a current BWP which is used to receive the DCIs; and, upon detection that at least one of the BWP indicator fields carried by the DCIs indicates to a BWP different from the current BWP, the processor 202 configures the receiver 214 and/or a transmitter 212 to perform a BWP change.

In some embodiments, values of the BWP indicator fields in the DCIs may indicate a same BWP, or a same BWP-ID. Each of the DCIs includes a time domain resource assignment field for indicating a slot offset. Each slot offset may, for example, be directed to a further slot for receiving PDSCH(s). Because DCIs carrying BWP indicator field are transmitted no later than the third symbol in a slot, the processor 202 may control the receiver 214 and/or the transmitter 212 to stop receiving and/or transmitting during a time period from an end of the third symbol in the slot until a beginning of a nearer further slot. The nearer further slot may be indicated by a smaller value of the time domain resource assignment fields of the DCIs.

In some other embodiments, values of the BWP indicator fields in the DCIs indicate different BWPs. The DCIs may comprise a first DCI indicating a first BWP, and a second DCI indicating a second BWP. The second DCI is received after reception of the first DCI. In this case, the processor 202 may configure the receiver 214 and/or the transmitter 212 to switch to the first BWP that is indicated by the first DCI. The second DCI and its corresponding PDSCH transmission(s) may thus be ignored.

Additionally or alternatively, the DCIs may comprise a first DCI received in time-frequency resource(s) identified by a first Control Resource Set (CORESET) indicating a first BWP and a second DCI received in time-frequency resource(s) identified by a second CORESET indicating a second BWP. Where the CORESETs are configured with indices, the processor 202 may configure the receiver 214 and/or the transmitter 212 to switch to a target BWP indicated by the BWP indicator field carried by the DCI transmitted in the time-frequency resource(s) identified by one of the CORESETs configured with a lower index value. Where the CORESETs are not configured with indices, the processor 202 configures the receiver 214 and/or the transmitter 212 to switch to a target BWP indicated by the BWP indicator field carried by the DCI transmitted in the time-frequency resource(s) identified by one of the CORESETs with a lower CORESET-ID.

In some yet further embodiments, the processor 202 may start a BWP inactivity timer 702, 802 upon detection of a DCI containing a BWP indicator field that indicates a BWP different from a default BWP. The default DL BWP may be provided by higher layers, or defined as an initial active DL BWP. The processor 202 determines a restart condition for the BWP inactivity timer 702, 802 according to a higher layer configuration. In a first option, the BWP inactivity timer 702, 802 may restart upon detection of one or more DCIs received in a non-default BWP in the time-frequency resource(s) identified by any one in a set of configured CORESETs before the BWP inactivity timer expires. Alternatively, in a second option, the BWP inactivity timer 702, 802 may restart upon detection of a DCI received in a non-default BWP in the time-frequency resource(s) identified by a selected one in a set of configured CORESETs before the BWP inactivity timer expires, the selected one being a CORESET configured with a lower index value.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A user equipment (UE) for wireless communication, comprising:
at least one memory; and
at least one processor coupled with the at least one memory and configured to cause the UE to:
receive, from multiple transmission reception points (TRPs) including at least a first TRP and a second TRP, a plurality of downlink control information (DCIs) in a slot, each DCI of the plurality of DCIs having a respective bandwidth part (BWP) indicator field for indicating a respective BWP for a corresponding downlink (DL) reception or uplink (UL) transmission, and values of the BWP indicator fields in the plurality of DCIs indicate a same BWP with a same BWP-ID;
schedule the UE with the same BWP;
start a BWP inactivity timer upon detection of a DCI containing a BWP indicator field that indicates a BWP different from a default BWP;
continue to run the BWP inactivity timer if one or more DCIs are received, before the BWP inactivity timer expires, in a first control resource set (CORESET) configured with a first CORESET index value based at least in part on the first CORESET index value being assigned to the first TRP of the multiple TRPs; and
restart the BWP inactivity timer if one or more DCIs are received, before the BWP inactivity timer expires, in a second CORESET configured with a second CORESET index value based at least in part on the second CORESET index value being assigned to the second TRP of the multiple TRPs.

2. The UE of claim 1, wherein the at least one processor is configured to cause the UE to:
detect whether any one of the respective BWPs indicated in the plurality of DCIs is different from a current BWP which is used to receive the plurality of DCIs; and
upon detection that at least one of the respective BWPs indicated by the plurality of DCIs is different from the current BWP, perform a BWP change.

3. The UE of claim 2, wherein the at least one processor is configured to cause the UE to at least one of stop receiving or stop transmitting during a time period from an end of a symbol in the slot until a beginning of a second slot, wherein each of the plurality of DCIs includes a respective time domain resource assignment field for indicating a slot offset, and the second slot is indicated by a smaller value of the time domain resource assignment fields.

4. The UE of claim 3, wherein:
the slot comprises a sequence of symbols;
the symbol is a third symbol in the sequence of symbols; and
the plurality of DCIs are received no later than the symbol.

5. The UE of claim 2, wherein:
values of the BWP indicator fields in the plurality of DCIs indicate different BWPs;
the plurality of DCIs comprise a first DCI indicating a first BWP and a second DCI indicating a second BWP, the second DCI received after reception of the first DCI; and
the at least one processor is configured to cause the UE to switch to the first BWP indicated by the first DCI, ignoring the second DCI.

6. The UE of claim 2, wherein:
values of the BWP indicator fields in the plurality of DCIs indicate different BWPs;
the plurality of DCIs comprise a first DCI indicating a first BWP and received in one or more time-frequency resources identified by the first CORESET configured with at least one of the first CORESET index value or a first CORESET identifier (CORESET-ID) value, and a second DCI indicating a second BWP and received in one or more time-frequency resources identified by the second CORESET configured with at least one of the second CORESET index value or a second CORESET-ID value; and
the at least one processor is configured to cause the UE to one of switch to the first BWP based on the first CORESET index value being less than the second CORESET index value, or switch to the first BWP based on the first CORESET-ID value being less than the second CORESET-ID value.

7. The UE of claim 1, wherein the at least one processor is configured to cause the UE to determine a restart condition for the BWP inactivity timer according to a higher layer configuration.

8. The UE of claim 1, wherein the BWP inactivity timer restarts based on receiving the one or more DCIs in a non-default BWP before the BWP inactivity timer expires.

9. The UE of claim 1, wherein the first CORESET is selected from a set of configured CORESETs based on the first CORESET index value.

10. A method performed by a user equipment (UE), the method comprising:
receiving, from multiple transmission reception points (TRPs) including at least a first TRP and a second TRP, a plurality of downlink control information (DCIs) in a slot, each DCI of the plurality of DCIs having a respective bandwidth part (BWP) indicator field for indicating a respective BWP for a corresponding downlink (DL) reception or uplink (UL) transmission;
detecting whether any one of the respective BWP indicator fields in the plurality of DCIs indicates a BWP different from a current BWP which is used to receive the DCIs;
starting a BWP inactivity timer based at least in part on detection that at least one of the respective BWP indicator fields indicates a BWP different from the current BWP;
continuing to run the BWP inactivity timer if one or more DCIs are received, before the BWP inactivity timer expires, in a first control resource set (CORESET) configured with a first CORESET index value based at least in part on the first CORESET index value being assigned to the first TRP of the multiple TRPs; and
restarting the BWP inactivity timer if one or more DCIs are received, before the BWP inactivity timer expires, in a second CORESET configured with a second CORESET index value based at least in part on the second CORESET index value being assigned to the second TRP of the multiple TRPs.

11. The method of claim 10, wherein values of the BWP indicator fields in the plurality of DCIs indicate a same BWP with a same BWP-ID.

12. The method of claim 11, further comprising stopping at least one of receiving or transmitting during a time period from an end of a symbol in the slot until a beginning of a second slot, wherein each DCI of the plurality of DCIs includes a respective time domain resource assignment field for indicating a slot offset, and the second slot is indicated by a smaller value of the time domain resource assignment fields.

13. The method of claim 12, wherein: the slot comprises a sequence of symbols;
the symbol is a third symbol in the sequence of symbols; and
the plurality of DCIs are received no later than the symbol.

14. The method of claim 10, wherein:
values of the BWP indicator fields in the plurality of DCIs indicate different BWPs;
the plurality of DCIs comprise a first DCI indicating a first BWP and a second DCI indicating a second BWP, the second DCI received after reception of the first DCI; and
the method further comprising switching to the first BWP indicated by the first DCI, ignoring the second DCI.

15. The method of claim 10, wherein:
values of the BWP indicator fields in the plurality of DCIs indicate different BWPs;
the plurality of DCIs comprise a first DCI indicating a first BWP and received in one or more time-frequency resources identified by the first CORESET configured with at least one of the first CORESET index value or a first CORESET identifier (CORESET-ID) value, and a second DCI indicating a second BWP and received in one or more time-frequency resources identified by the second CORESET configured with at least one of the second CORESET index value or a second CORESET-ID value; and
the method further comprising one of switching to the first BWP based on the first CORESET index value being less than the second CORESET index value, or switching to the first BWP based on the first CORESET-ID value being less than the second CORESET-ID value.

16. The method of claim 10, further comprising determining a restart condition for the BWP inactivity timer according to a higher layer configuration.

17. The method of claim 10, wherein the BWP inactivity timer restarts based on receiving the one or more DCIs in a non-default BWP before the BWP inactivity timer expires.

18. The method of claim 10, wherein the first CORESET is selected from a set of configured CORESETs based on the first CORESET index value.

19. A processor for wireless communication, comprising:
at least one controller coupled with at least one memory and configured to cause the processor to:
receive, from multiple transmission reception points (TRPs) including at least a first TRP and a second TRP, a plurality of downlink control information (DCIs) in a slot, each DCI of the plurality of DCIs having a respective bandwidth part (BWP) indicator field for indicating a respective BWP for a corresponding downlink (DL) reception or uplink (UL) transmission, and values of the BWP indicator fields in the plurality of DCIs indicate a same BWP with a same BWP-ID;
schedule the processor with the same BWP;
start a BWP inactivity timer upon detection of a DCI containing a BWP indicator field that indicates a BWP different from a default BWP;
continue to run the BWP inactivity timer if one or more DCIs are received, before the BWP inactivity timer expires, in a first control resource set (CORESET) configured with a first CORESET index value based at least in part on the first CORESET index value being assigned to the first TRP of the multiple TRPs; and
restart the BWP inactivity timer if one or more DCIs are received, before the BWP inactivity timer expires, in a second CORESET configured with a second CORESET index value based at least in part on the second CORESET index value being assigned to the second TRP of the multiple TRPs.

20. The processor of claim 19, wherein the at least one controller is configured to cause the processor to:
detect whether any one of the respective BWPs indicated in the plurality of DCIs is different from a current BWP which is used to receive the plurality of DCIs; and
perform a BWP change based on detection that at least one of the respective BWPs indicated by the plurality of DCIs is different from the current BWP.

* * * * *